US009112257B2

(12) United States Patent
Li et al.

(10) Patent No.: US 9,112,257 B2
(45) Date of Patent: Aug. 18, 2015

(54) COMMUNICATION DEVICE AND METHOD FOR ENHANCING IMPEDANCE BANDWIDTH OF ANTENNA THEREOF

(75) Inventors: Wei-Yu Li, Yilan County (TW); Hung-Hsuan Lin, Hsinchu County (TW); Ta-Chun Pu, Kaohsiung (TW); Chun-Yih Wu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 232 days.

(21) Appl. No.: 13/419,433

(22) Filed: Mar. 14, 2012

(65) Prior Publication Data
US 2013/0038491 A1    Feb. 14, 2013

(30) Foreign Application Priority Data

Aug. 31, 2011  (TW) .............................. 100131333 A
Oct. 26, 2011  (TW) .............................. 100138922 A

(51) Int. Cl.
*H01Q 1/48*     (2006.01)
*H01Q 9/04*     (2006.01)
(Continued)

(52) U.S. Cl.
CPC ............. *H01Q 5/0041* (2013.01); *H01Q 1/243* (2013.01); *H01Q 1/48* (2013.01); *H01Q 5/0093* (2013.01); *H01Q 9/0442* (2013.01); *H01Q 9/145* (2013.01)

(58) Field of Classification Search
CPC .............. H01Q 1/38; H01Q 1/48; H01Q 9/40
USPC .................. 343/700 MS, 702, 848
See application file for complete search history.

(56) References Cited

U.S. PATENT DOCUMENTS 4,218,682 A * 8/1980 Frosch et al. .......... 343/700 MS
4,929,959 A * 5/1990 Sorbello et al. ........ 343/700 MS
(Continued)

FOREIGN PATENT DOCUMENTS

CN       1694303      11/2005
CN     101740852       6/2010
(Continued)

OTHER PUBLICATIONS

"Search Report of Europe Counterpart Application", issued on Dec. 20, 2012, p. 1-p. 6.
(Continued)

Primary Examiner — Robert Karacsony
Assistant Examiner — Daniel J Munoz
(74) Attorney, Agent, or Firm — Jianq Chyun IP Office

(57) ABSTRACT

A communication device and a method for enhancing impedance bandwidth of an antenna are provided. The communication device includes at least one ground, at least one antenna, a current-drawing conductor structure, and at least one coupling conductor structure. The antenna is electrically connected to the ground through a source and generates at least one operating frequency band for transmitting or receiving electromagnetic signals of at least one communication band. The current-drawing conductor structure includes a plurality of conductor elements, where there is at least one mutual coupling portion formed between neighboring conductor elements. The coupling conductor structure has a first conductor portion and a second conductor portion. One end of the first conductor portion is electrically connected to the ground, and another end thereof is electrically connected to the second conductor portion. There is at least one coupling portion formed between the second conductor portion and the current-drawing conductor structure.

19 Claims, 11 Drawing Sheets

(51) Int. Cl.
*H01Q 5/00* (2006.01)
*H01Q 1/24* (2006.01)
*H01Q 9/14* (2006.01)

(56) References Cited

U.S. PATENT DOCUMENTS

| | | |
|---|---|---|
| 6,326,927 B1 | 12/2001 | Johnson et al. |
| 6,395,971 B1 | 5/2002 | Bendel et al. |
| 6,421,016 B1 | 7/2002 | Phillips et al. |
| 6,615,026 B1 | 9/2003 | Wong |
| 6,947,000 B2 | 9/2005 | Ito |
| 6,992,633 B2 * | 1/2006 | Kim et al. ............. 343/700 MS |
| 7,099,631 B2 | 8/2006 | Lee et al. |
| 7,173,568 B2 | 2/2007 | Kanazawa |
| 2007/0034247 A1 | 2/2007 | Takada et al. |
| 2009/0213026 A1 | 8/2009 | Lindberg et al. |
| 2010/0053013 A1* | 3/2010 | Konishi et al. ............... 343/772 |
| 2010/0187400 A1 | 7/2010 | Mazzarotto |
| 2010/0234081 A1 | 9/2010 | Wong et al. |
| 2011/0032165 A1* | 2/2011 | Heng et al. .................... 343/745 |
| 2011/0063189 A1 | 3/2011 | Cohen et al. |
| 2011/0248895 A1* | 10/2011 | Bungo et al. .................. 343/702 |
| 2011/0248901 A1* | 10/2011 | Alexopoulos et al. ........ 343/836 |

FOREIGN PATENT DOCUMENTS

| | | |
|---|---|---|
| EP | 2230723 | 9/2010 |
| JP | 2006325268 | 11/2006 |
| JP | 2009225159 | 10/2009 |
| JP | 2011055036 | 3/2011 |
| JP | 2011166416 | 8/2011 |
| TW | I239658 | 9/2005 |
| WO | 2009026304 | 2/2009 |

OTHER PUBLICATIONS

"Notice of Allowance of Japan Counterpart Application", issued on Apr. 8, 2014, p. 1-p. 3.
"Office Action of China Counterpart Application," issued on Apr. 1, 2015, p. 1-6, in which the listed references were cited.

* cited by examiner

601 — A current-drawing conductor structure having a plurality of conductor elements is disposed on a casing of a communication device having at least one antenna and at least one ground 602 — A coupling conductor structure having a first conductor portion and a second conductor portion is connected to the ground of the communication device

FIG. 6

COMMUNICATION DEVICE AND METHOD FOR ENHANCING IMPEDANCE BANDWIDTH OF ANTENNA THEREOF

CROSS-REFERENCE TO RELATED APPLICATION

This application claims the priority benefit of Taiwan application serial no. 100131333, filed Aug. 31, 2011 and Taiwan application serial no. 100138922, filed on Oct. 26, 2011. The entirety of each of the above-mentioned patent applications is hereby incorporated by reference herein and made a part of this specification.

BACKGROUND

1. Field of the Disclosure

The disclosure relates to a communication device and a method for enhancing the impedance bandwidth of an antenna thereof.

2. Description of Related Art

With the development of wireless and mobile communication technologies, people can talk to another person or obtain information wirelessly any where and any time. Thus, mobile communication devices have become indispensable tools in people's daily life, and are products with high commercial values.

However, in order to avoid the situation that users have to change the mobile communication devices due to different communication systems used by different countries or areas, the current mobile communication devices must be capable of multiband operation for different mobile and wireless communication systems. Although the trend is that mobile communication devices will integrate more and more different communication systems, the usable antenna space in mobile communication devices is gradually reduced How to effectively enhance the impedance bandwidth of an antenna in the communication device will become an important research and development issue in the future.

SUMMARY

An exemplary embodiment of the disclosure provides a communication device including at least one ground, at least one antenna, a current-drawing conductor structure and at least one coupling conductor structure. The at least one antenna is electrically connected to the at least one ground through a source and generates at least one operating band for transmitting or receiving electromagnetic signals of at least one communication band. The current-drawing conductor structure includes a plurality of conductor elements, where there is at least one mutual coupling portion formed between neighboring conductor elements. The at least one coupling conductor structure has a first conductor portion and a second conductor portion. One end of the first conductor portion is electrically connected to the at least one ground, and another end thereof is electrically connected to the second conductor portion. There is at least one coupling portion formed between the second conductor portion and the current-drawing conductor structure.

Another exemplary embodiment of the disclosure provides a method for enhancing impedance bandwidth of an antenna, which is adapted to an antenna of a communication device. The method includes following steps. A current-drawing conductor structure is disposed on a casing of a communication device having at least one antenna and at least one ground, where the current-drawing conductor structure includes a plurality of conductor elements, and there is at least one mutual coupling portion formed between neighboring conductor elements. A coupling conductor structure is connected to the ground, where the coupling conductor structure has a first conductor portion and a second conductor portion, one end of the first conductor portion is electrically connected to the at least one ground, and another end thereof is electrically connected to the second conductor portion. There is at least one coupling portion formed between the second conductor portion and the current-drawing conductor structure.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 6 is a flowchart illustrating a method for enhancing an impedance bandwidth of an antenna of a communication device according to an exemplary embodiment of the disclosure.

DETAILED DESCRIPTION OF DISCLOSED EMBODIMENTS

Figure 1A:
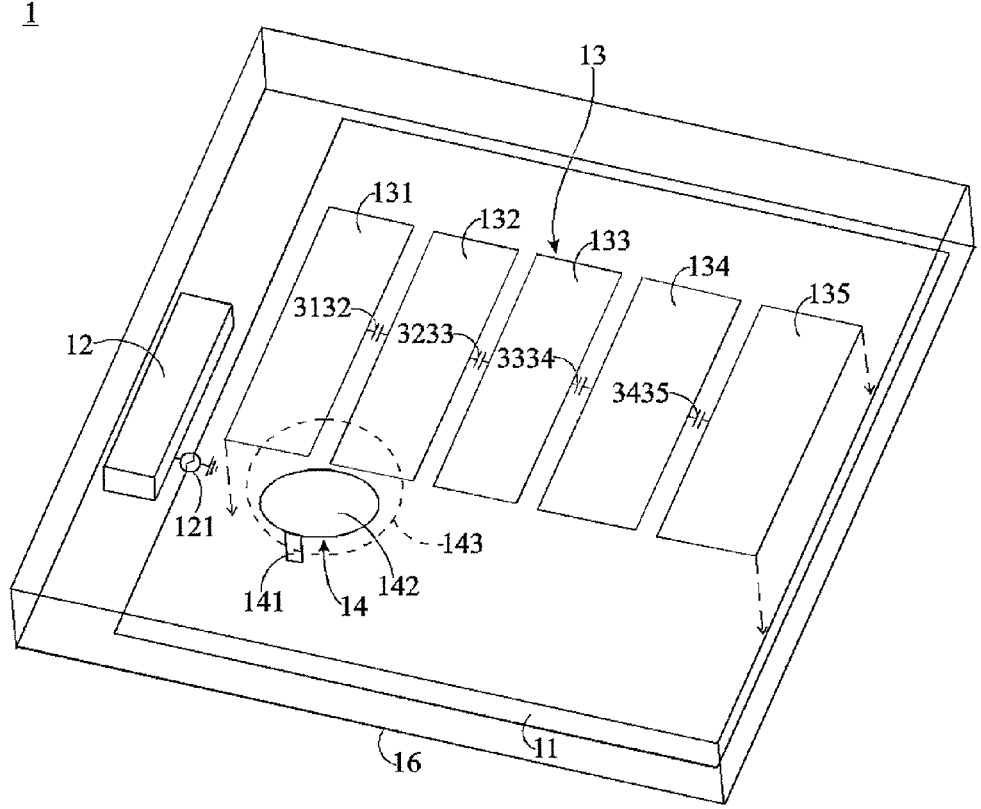
FIG. 1A is a structural schematic diagram of a communication device 1 according to an exemplary embodiment of the disclosure.

Below, exemplary embodiments will be described in detail with reference to accompanying drawings so as to be easily realized by a person having ordinary knowledge in the art. The inventive concept can be embodied in various forms without being limited to the exemplary embodiments set forth herein. Descriptions of well-known parts are omitted for clarity, and like reference numerals refer to like elements throughout.

The disclosure provides a plurality of exemplary embodiments for a communication device and a method for enhancing the impedance bandwidth of an antenna thereof. These exemplary embodiments could be applied to various communication devices, for example, a mobile communication device, a wireless communication device, a mobile computing device and a computer system, or could be applied to telecom equipment, network equipment, or peripheral equipment of a computer or a network.

FIG. 1A is a structural schematic diagram of a communication device 1 according to an exemplary embodiment of the disclosure. The communication device 1 has at least one ground 11, at least one antenna 12, a current-drawing conductor structure 13, at least one coupling conductor structure 14 and a casing 16. The antenna 12 is electrically connected to the ground 11 through a source 121 (or a signal source) and generates at least one operating band for transmitting or receiving electromagnetic signals of at least one communication band. For example, the antenna 12 could be monopole antenna types, shorted monopole antenna types, planner inverted F antenna (PIFA) types, inverted F antenna (IFA) types, loop antenna types, slot antenna types, helical antenna types, quadrifilar helical antenna types (QHA), N-filar helical antenna types (NHA) or combinations thereof. In the present exemplary embodiment, the communication device 1 could also have a plurality of sources for electrically connecting a plurality of antennas to the ground 11, and the position, where only one or a plurality of antennas could be disposed, illustrated in FIG. 1A though possible implementation of the disclosure is not limited thereto.

Referring to FIG. 1A, the current-drawing conductor structure 13 is disposed on the casing 16, and has a plurality of conductor elements 131, 132, 133, 134 and 135, where mutual coupling portions 3132, 3233, 3334 and 3435 are formed between neighboring conductor elements in the current-drawing conductor structure 13. For example, the mutual coupling portions 3132, 3233, 3334 and 3435 between the conductor elements 131, 132, 133, 134 and 135 could be respectively formed by chip capacitors or other extending conductor portions.

The at least one coupling conductor structure 14 has a first conductor portion 141 and a second conductor portion 142. One end of the first conductor portion 141 is electrically connected to the ground 11, and another end thereof is electrically connected to the second conductor portion 142. The second conductor portion 142 and the current-drawing conductor structure 13 form a coupling portion 143. The shortest distance between the source 121 and the position where the first conductor portion 141 is electrically connected to the ground 11 is less than half wavelength of the lowest operating frequency of the lowest operating band of the antenna 12. The second conductor portion 142 approximately has an oval shape, and the conductor elements 131, 132, 133, 134 and 135 approximately have rectangular shapes, though possible implementation of the disclosure is not limited thereto. The second conductor portion 142 could also have other shapes other than the oval shape, and the conductor elements 131, 132, 133, 134 and 135 could also have other shapes other than the rectangular shapes. For example, the conductor elements 131, 132, 133, 134 and 135 and the second conductor portion 142 could also be metal sheets of different shapes, or the conductor elements 131, 132, 133, 134 and 135 could have a plurality of metal branches. Moreover, the conductor elements 131, 132, 133, 134 and 135 could be different metal materials, metal electrodes, or electrodes of a solar photovoltaic apparatus.

Figure 1B:
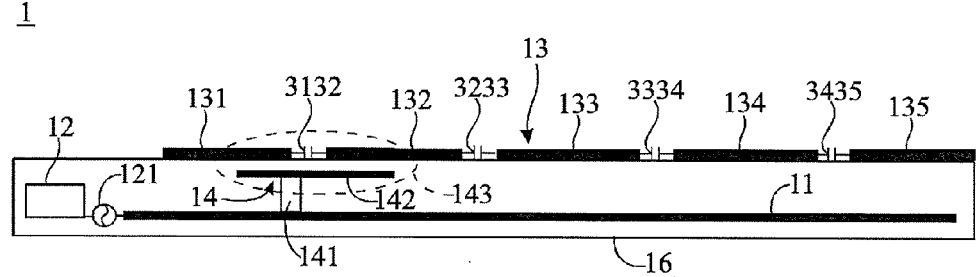
FIG. 1B is a structural cross-sectional view of the communication device 1 according to an exemplary embodiment of the disclosure.

When the antenna 12 resonates in an operating band, the ground 11 would excite strong surface current distribution. Therefore, by designing the mutual coupling between the coupling conductor structure 14 and the current-drawing conductor structure 13, the current-drawing conductor structure 13 could equivalently form another effective extending ground for the antenna 12. Moreover, because the effective extending ground of the antenna 12 has a plurality of the conductor elements 131, 132, 133, 134 and 135 mutually coupled to each other, several coupling current resonant paths with different effective lengths could be formed. Therefore, by configuring the mutual coupling between the current-drawing conductor structure 13 and the coupling conductor structure 14, the antenna 12 could generate a plurality of resonant modes in the operating band, so that impedance bandwidth of at least one operating band of the antenna 12 could be effectively enhanced. Such operating band could be used to transmit or receive electromagnetic signals of at least one communication band. Besides, the formed effective extending ground of the antenna 12 could have an opportunity to reduce the strength of excited surface current on the ground 11, so as to reduce values of specific absorption rate (SAR) or hearing aid compatible (HAC) test of the antenna 12 in operating bands. FIG. 1B is a structural cross-sectional view of the communication device 1 of FIG. 1A.

Figure 2:
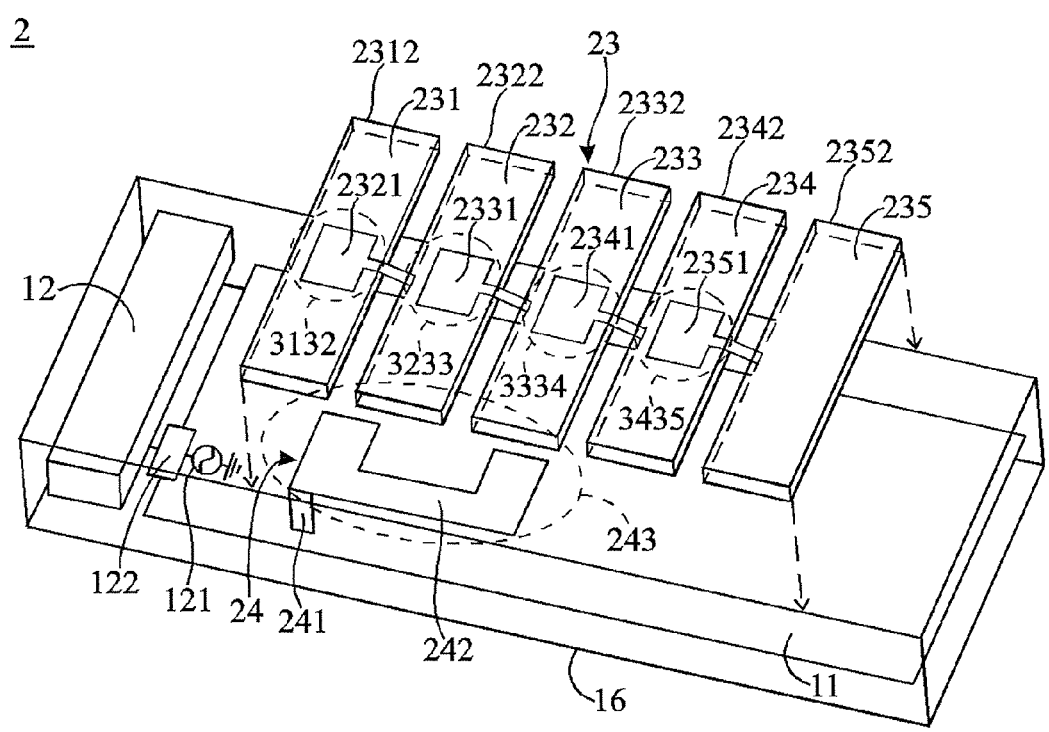
FIG. 2 is a structural schematic diagram of a communication device 2 according to an exemplary embodiment of the disclosure.

FIG. 2 is a structural schematic diagram of a communication device 2 according to an exemplary embodiment of the disclosure. The communication device 2 includes at least one ground 11, at least one antenna 12, a current-drawing conductor structure 23, at least one coupling conductor structure 24 and a casing 16. The antenna 12 is connected to a source 121 through a matching circuit 122, and generates at least one operating band for transmitting or receiving electromagnetic signals of at least one communication band. The matching circuit 122 is used to adjust the impedance matching of resonant modes of the antenna 12. For example, the antenna 12 could be monopole antenna types, shorted monopole antenna types, planner inverted F antenna types, inverted F antenna types, loop antenna types, slot antenna types, helical antenna types, quadrifilar helical antenna types, N-filar helical antenna types or combinations thereof.

Referring to FIG. 2, the current-drawing conductor structure 23 is disposed on the casing 16, and has a plurality of conductor elements 231, 232, 233, 234 and 235. An extending conductor portion 2321 of the conductor element 232 and the conductor element 231 are respectively disposed on an upper surface and a lower surface of a dielectric substrate 2312 to form a mutual coupling portion 3132. For example, the conductor element 231 is disposed on the lower surface of the dielectric substrate 2312, and the extending conductor portion 2321 connected to the conductor element 232 is disposed on the upper surface of the dielectric substrate 2312. An extending conductor portion 2331 of the conductor element 233 and the conductor element 232 are respectively disposed on an upper surface and a lower surface of a dielectric substrate 2322 to form a mutual coupling portion 3233. An extending conductor portion 2341 of the conductor element 234 and the conductor element 233 are respectively disposed on an upper and a lower surface of a dielectric substrate 2332 to form a mutual coupling portion 3334. An extending conductor portion 2351 of the conductor element 235 and the conductor element 234 are respectively disposed on an upper surface and a lower surface of a dielectric substrate 2342 to form a mutual coupling portion 3435. For example, the extending conductor portions 2321, 2331, 2341, 2351 could be metal sheets of the same shapes, which are rectangular metal sheets, but the present disclosure is not limited thereto. The conductor element 235 is disposed on a lower surface of a dielectric substrate 2352. The coupling spacing of the mutual coupling portion 3132 between the extending conductor portion 2321 and the conductor element 231 is less than 1% of the wavelength of the lowest operating frequency of the lowest operating band of the antenna 12. The coupling spacings of the mutual coupling portions 3233, 3334 and 3435 are also less than 1% of the wavelength of the lowest operating frequency of the lowest operating band of the antenna 12. Moreover, the dielectric substrates 2312, 2322, 2332, 2342 and 2352 could be different materials of a dielectric material, a plastic material, a flexible printed circuit board material, a photoelectric conversion material, a photoelectric semiconductor material or a solar photovoltaic conversion material, etc.

The at least one coupling conductor structure 24 has a first conductor portion 241 and a second conductor portion 242, one end of the first conductor portion 241 is electrically connected to the ground 11, and another end thereof is electrically connected to the second conductor portion 242. The second conductor portion 242 and the current-drawing conductor structure 23 form a coupling portion 243. The coupling spacing of the coupling portion 243 between the second conductor portion 242 and the current-drawing conductor structure 23 is less than 2% of the wavelength of the lowest operating frequency of the lowest operating band of the antenna 12. The second conductor portion 242 has two metal branches, and the shortest distance between the source 121 and the position where the first conductor portion 241 is electrically connected to the ground 11 is less than a half wavelength of the lowest operating frequency of the lowest operating band of the antenna 12. The conductor elements 231, 232, 233, 234 and 235 approximately have rectangular shapes, and the second conductor portion 242 has a shape approximately like a "U" shape with squared edges, but possible implementation of the disclosure is not limited thereto. Moreover, the conductor elements 231, 232, 233, 234 and 235 could be different metal materials, metal electrodes, or electrodes of a solar photovoltaic conversion apparatus. When the antenna 12 resonates in an operating band, the ground 11 would excite strong surface current distribution. Therefore, by designing the mutual coupling between the coupling conductor structure 24 and the current-drawing conductor structure 23, the current-drawing conductor structure 23 could equivalently form another effective extending ground for the antenna 12.

When more conductor elements form capacitive coupling with the second conductor portion 242, the coupling strength between the coupling conductor structure 24 and the current-drawing conductor structure 23 would be enhanced. Moreover, because the formed effective extending ground of antenna 12 has a plurality of the conductor elements 231, 232, 233, 234 and 235 mutually coupled to each other, several coupling current resonant paths with different effective lengths could be formed. Therefore, by configuring the mutual coupling between the current-drawing conductor structure 23 and the coupling conductor structure 24, the antenna 12 could generate a plurality of resonant modes in the operating band, so that the impedance bandwidth of at least one operating band of the antenna 12 could be effectively enhanced. Such operating band could be used to transmit or receive electromagnetic signals of at least one communication band. Moreover, the formed effective extending antenna ground could have an opportunity to reduce the strength of excited surface current on the ground 11, so as to reduce SAR or HAC values of antenna 12 in operating bands.

Figure 3:
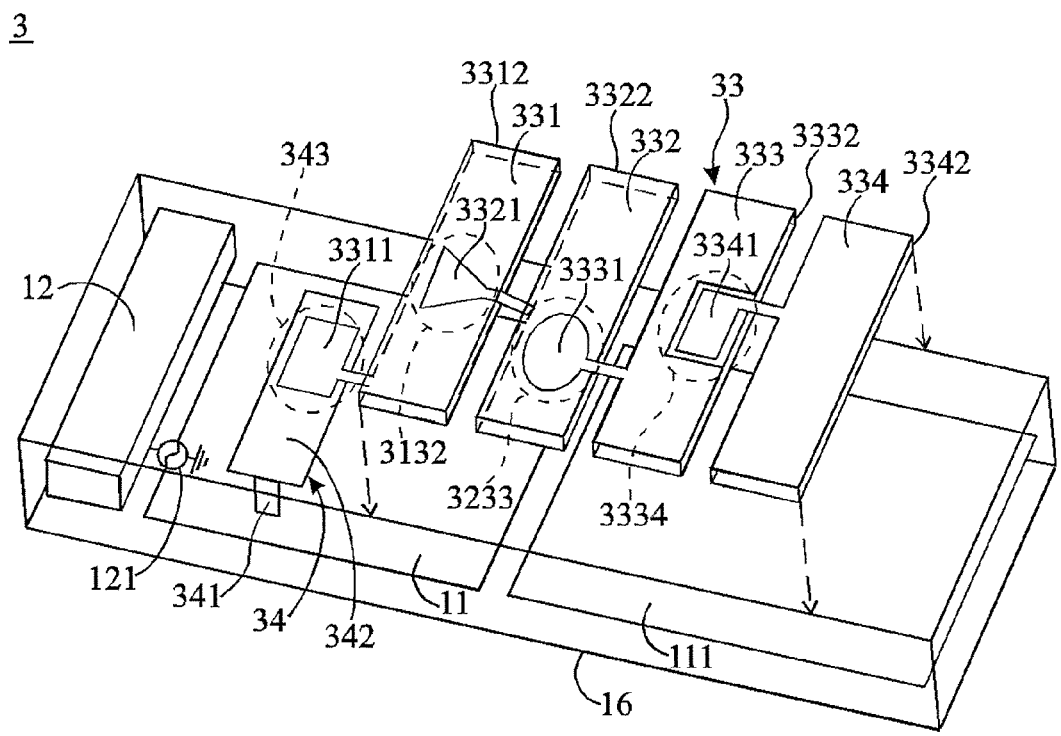
FIG. 3 is a structural schematic diagram of a communication device 3 according to an exemplary embodiment of the disclosure.

FIG. 3 is a structural schematic diagram of a communication device 3 according to an exemplary embodiment of the disclosure. The communication device 3 includes two separated ground 11 and ground 111, at least one antenna 12, a current-drawing conductor structure 33, at least one coupling conductor structure 34 and a casing 16. The at least one antenna 12 is connected to the ground 11 through a source 121, and generates at least one operating band for transmitting or receiving electromagnetic signals of at least one communication band. In other embodiments, the grounds 11 and 111 could also be electrically connected through coaxial cables, signal transmission lines or metal wires. The at least one antenna 12 could be monopole antenna types, shorted monopole antenna types, planner inverted F antenna types, inverted F antenna types, loop antenna types, slot antenna types, helical antenna types, quadrifilar helical antenna types, N-filar helical antenna types or combinations thereof.

Referring to FIG. 3, the current-drawing conductor structure 33 is disposed on the casing 16, and has a plurality of conductor elements 331, 332, 333 and 334. An extending conductor portion 3321 of the conductor element 332 and the conductor element 331 are respectively disposed on an upper surface and a lower surface of a dielectric substrate 3312 to form a mutual coupling portion 3132. An extending conductor portion 3331 of the conductor element 333 and the conductor element 332 are respectively disposed on an upper surface and a lower surface of a dielectric substrate 3322 to form a mutual coupling portion 3233. An extending conductor portion 3341 of the conductor element 334 and the conductor element 333 are respectively disposed on an upper surface of a dielectric substrate 3332 to form a mutual coupling portion 3334. The conductor element 334 is disposed on an upper surface of a dielectric substrate 3342. The coupling spacing of the mutual coupling portions 3132 between the extending conductor portion 3321 and the conductor element 331 is less than 1% of the wavelength of the lowest operating frequency of the lowest operating band of the antenna 12. The coupling spacings of the mutual coupling portions 3233 and 3334 are also less than 1% of the wavelength of the lowest operating frequency of the lowest operating band of the antenna 12. For example, the extending conductor portions 3311, 3321, 3331 and 3341 could be metal sheets with different shapes or have a plurality of metal branches. Moreover, the dielectric substrates 3312, 3322, 3332 and 3342 could be different materials of a dielectric material, a plastic material, a flexible printed circuit board material, a photoelectric conversion material, a photoelectric semiconductor material or a solar photovoltaic conversion material, etc.

The coupling conductor structure 34 has a first conductor portion 341 and a second conductor portion 342, one end of the first conductor portion 341 is electrically connected to the ground 11, and another end thereof is electrically connected to the second conductor portion 342. The second conductor portion 342 and extending conductor portion 3311 of the current-drawing conductor structure 33 form a coupling portion 343. The coupling spacing of the coupling portion 343 between the extending conductor portion 3311 and the second conductor portion 342 is less than 2% of the wavelength of the lowest operating frequency of the lowest operating band of the antenna 12. A shape of the second conductor portion 342 is approximately a rectangle, and the shortest distance between the source 121 and the position where the first conductor portion 341 is electrically connected to the ground 11 is less than a half wavelength of the lowest operating frequency of the lowest operating band of the antenna 12. The conductor elements 331, 332, 333 and 334 are approximately rectangular shapes, and the second conductor portion 342 has approximately a rectangular shape, but possible implementation of the disclosure is not limited thereto. Moreover, the conductor elements 331, 332, 333 and 334 could be different metal materials, metal electrodes, or electrodes of a solar photovoltaic apparatus.

When the antenna 12 resonates in an operating band, the ground 11 would excite strong surface current distribution. Therefore, by designing the coupling portion 343 formed by the coupling conductor structure 34 and the current-drawing conductor structure 33, the current-drawing conductor structure 33 could equivalently form another effective extending ground for the antenna 12. When more conductor elements form capacitive coupling with the second conductor portion 342, the energy coupling strength between the coupling conductor structure 34 and the current-drawing conductor structure 33 would be enhanced. Moreover, because the formed effective extending ground of antenna 12 has a plurality of the conductor elements 331, 332, 333 and 334 mutually coupled to each other, a plurality of coupling current resonant paths with different effective lengths could be formed. Therefore, by configuring the mutual coupling between the current-drawing conductor structure 33 and the coupling conductor structure 34, the antenna 12 could generate a plurality of resonant modes in the operating band, so that the impedance bandwidth of at least one operating band of the antenna 12 could be effectively enhanced. Such operating band could be used to transmit or receive electromagnetic signals of at least one communication band. Moreover, the formed effective extending ground of antenna 12 could have an opportunity to reduce the strength of excited surface current on the ground 11, so as to reduce SAR or HAC values of the antenna 12 in operating bands.

Figure 4A:
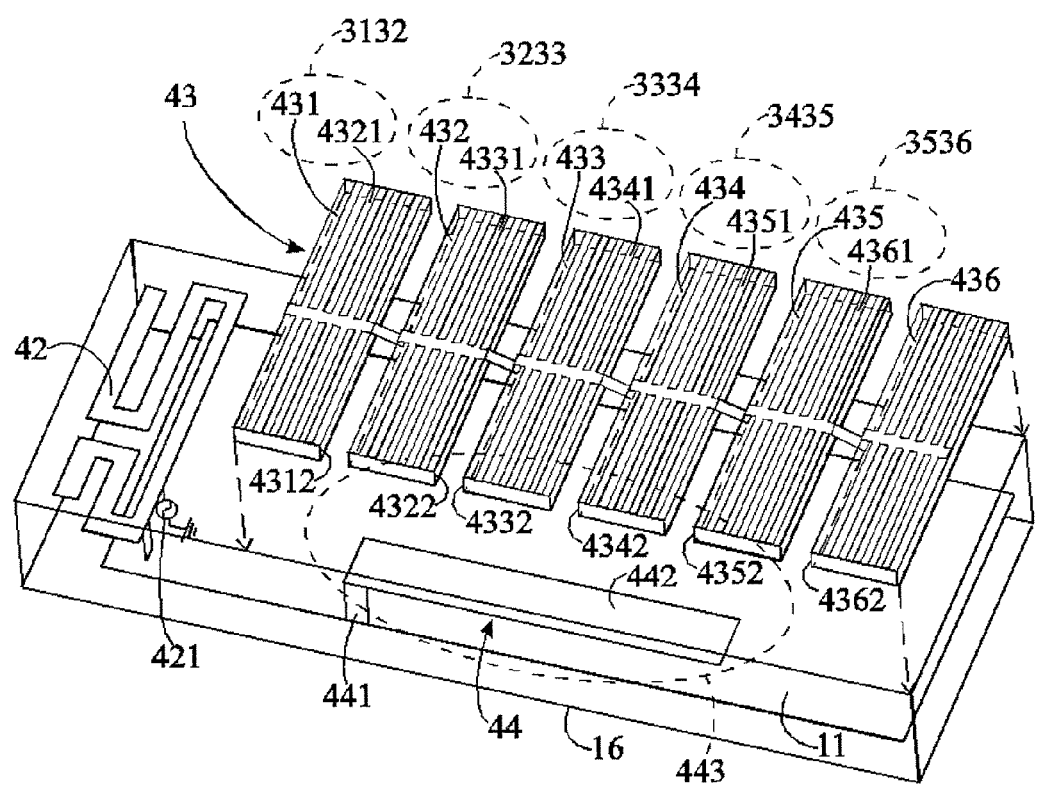
FIG. 4A is a structural schematic diagram of a communication device 4 according to an exemplary embodiment of the disclosure.

FIG. 4A is a structural schematic diagram of a communication device 4 according to an exemplary embodiment of the disclosure. The communication device 4 includes a ground 11, an antenna 42, a current-drawing conductor structure 43, a coupling conductor structure 44 and a casing 16. For example, the antenna 42 is a dual-path shorted monopole antenna, which is connected to the ground 11 through a source 421, and generates at least one operating band for transmitting or receiving electromagnetic signals of at least one communication band. However, possible implementation of the disclosure is not limited thereto, and the antenna 42 could also be monopole antenna types, planner inverted F antenna types, inverted F antenna types, loop antenna types, slot antenna types, helical antenna types, quadrifilar helical antenna types, N-filar helical antenna types or combinations thereof.

Referring to FIG. 4A, the current-drawing conductor structure 43 is disposed on the casing 16, and has a plurality of conductor elements 431, 432, 433, 434, 435 and 436. An extending conductor portion 4321 of the conductor element 432 and the conductor element 431 are respectively disposed on an upper surface and a lower surface of a dielectric substrate 4312 to form a mutual coupling portion 3132. For example, the conductor element 431 is disposed on the lower surface of the dielectric substrate 4312, and the extending conductor portion 4321 connected to the conductor element 432 is disposed on the upper surface of the dielectric substrate 4312. An extending conductor portion 4331 of the conductor element 433 and the conductor element 432 are respectively disposed on an upper surface and a lower surface of a dielectric substrate 4322 to form a mutual coupling portion 3233. An extending conductor portion 4341 of the conductor element 434 and the conductor element 433 are respectively disposed on an upper surface and a lower surface of a dielectric substrate 4332 to form a mutual coupling portion 3334. An extending conductor portion 4351 of the conductor element 435 and the conductor element 434 are respectively disposed on an upper surface and a lower surface of a dielectric substrate 4342 to form a mutual coupling portion 3435. An extending conductor portion 4361 of the conductor element 436 and the conductor element 435 are respectively disposed on an upper surface and a lower surface of a dielectric substrate 4352 to form a mutual coupling portion 3536. The conductor element 436 is disposed on a lower surface of a dielectric substrate 4362. The coupling spacing of the mutual coupling portions 3132 between the extending conductor portion 4321 and the conductor element 431 is less than 1% of a wavelength of a lowest operating frequency of a lowest operating band of the antenna 42. The coupling spacings of the mutual coupling portions 3233, 3334, 3435 and 3536 are also less than 1% of a wavelength of a lowest operating frequency of a lowest operating band of the antenna 42.

The extending conductor portions 4321, 4331, 4341, 4351 and 4361 respectively have a shape of a fish bone, though possible implementation of the disclosure is not limited thereto, and the extending conductor portions 4321, 4331, 4341, 4351 and 4361 could also be metal sheets with different shapes or have a plurality of metal branches. Moreover, the dielectric substrates 4312, 4322, 4332, 4342, 4352 and 4362 could be different materials of a dielectric material, a plastic material, a flexible printed circuit board material, a photoelectric conversion material, a photoelectric semiconductor material or a solar photovoltaic conversion material, etc.

The coupling conductor structure 44 has a first conductor portion 441 and a second conductor portion 442, one end of the first conductor portion 441 is electrically connected to the ground 11, and another end thereof is electrically connected to the second conductor portion 442. The second conductor portion 442 and the current-drawing conductor structure 43 form a coupling portion 443. The coupling spacing of the coupling portion 443 between the second conductor portion 442 and the current-drawing conductor structure 43 is less than 2% of the wavelength of the lowest operating frequency of the lowest operating band of the antenna 42. A shape of the second conductor portion 442 is approximately a rectangle, and the shortest distance between the source 421 and the position where the first conductor portion 441 is electrically connected to the ground 11 is less than a half wavelength of the lowest operating frequency of the lowest operating band of the antenna 42. The conductor elements 431, 432, 433, 434, 435 and 436 approximately have rectangular shapes, and the second conductor portion 442 has approximately a rectangular shape, but possible implementation of the disclosure is not limited thereto. Moreover, the conductor elements 431, 432, 433, 434, 435 and 436 could be different metal materials, metal electrodes, or electrodes of a solar photovoltaic conversion apparatus.

Figure 4B:
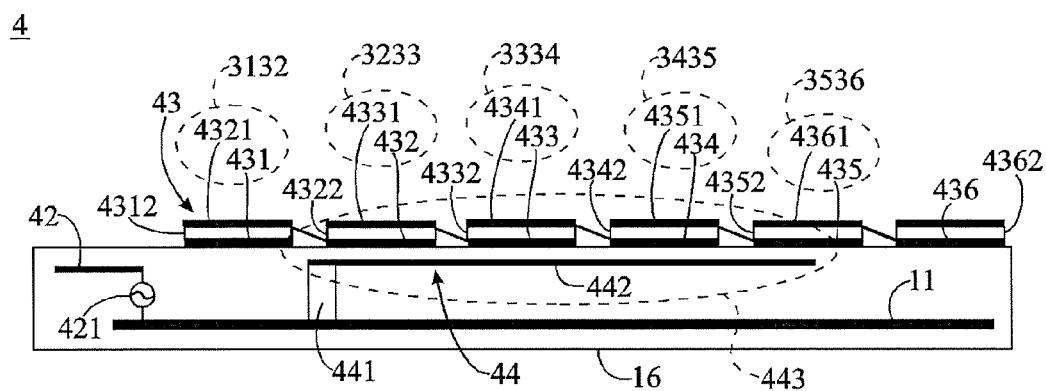
FIG. 4B is a structural cross-sectional view of the communication device 4 according to an exemplary embodiment of the disclosure.

When the antenna 42 resonates in an operating band, the ground 11 would excite strong surface current distribution. Therefore, by designing the coupling portion 443 of the coupling conductor structure 44 and the current-drawing conductor structure 43, the current-drawing conductor structure 43 could equivalently form another effective extending ground for the antenna 42. When more conductor elements form capacitive coupling with the second conductor portion 442, the energy coupling strength between the coupling conductor structure 44 and the current-drawing conductor structure 43 would be enhanced. Moreover, because the formed effective extending ground of the antenna 42 has a plurality of the conductor elements 431, 432, 433, 434, 435 and 436 mutually coupled to each other, a plurality of coupling current resonant paths with different effective lengths could be formed. Therefore, by configuring the mutual coupling between the current-drawing conductor structure 43 and the coupling conductor structure 44, the antenna 42 could generate a plurality of resonant modes in the operating band, so that an impedance bandwidth of at least one operating band of the antenna 42 could be effectively enhanced. Such operating band could be used to transmit or receive electromagnetic signals of at least one communication band. Moreover, the formed effective extending ground of antenna 42 could have an opportunity to reduce the strength of excited surface current on the ground 11, so as to reduce SAR or HAC values of the antenna 42 in operating bands. FIG. 4B is a structural cross-sectional view of the communication device 4 of FIG. 4A.

Figure 4C:
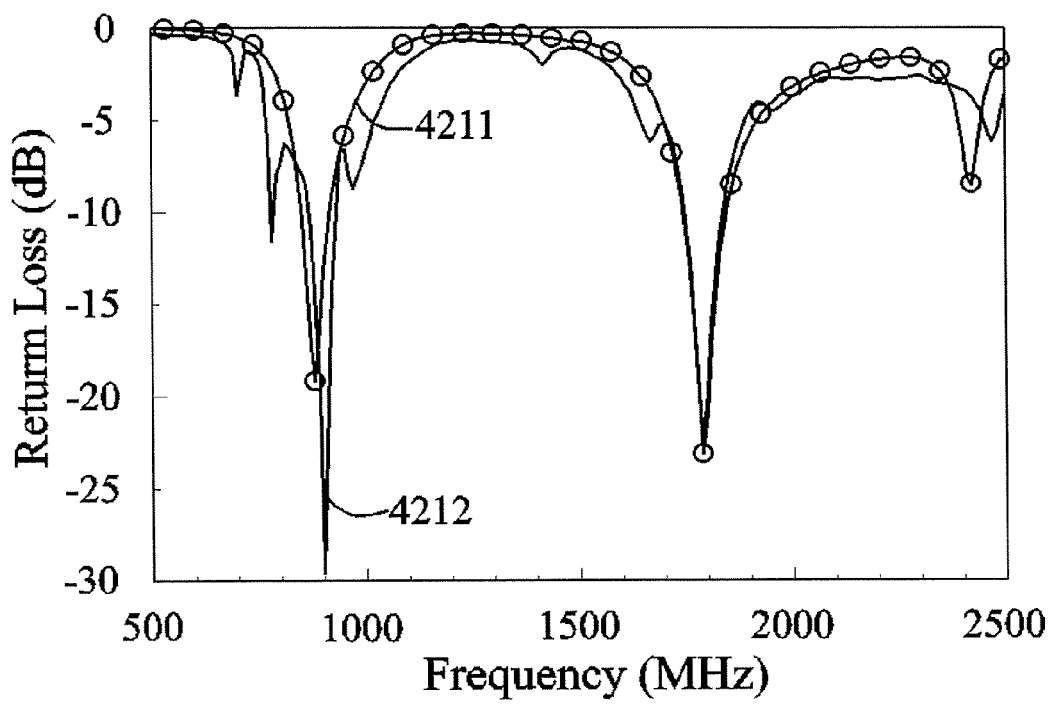
FIG. 4C is a diagram illustrating measured return losses of an antenna of the communication device 4 in case that a coupling conductor structure and a current-drawing conductor structure are configured with the antenna/not configured with the antenna.

FIG. 4C is a diagram illustrating measured return losses of the antenna 42 of the communication device 4 in case that the coupling conductor structure 44 and the current-drawing conductor structure 43 are configured with the antenna 42/not configured with the antenna 42. A curve 4211 is a measured return loss curve of the antenna 42 in case that the coupling conductor structure 44 and the current-drawing conductor structure 43 are not configured with the antenna 42. A curve 4212 is a measured return loss curve of the antenna 42 in case that the coupling conductor structure 44 and the current-drawing conductor structure 43 are configured with the antenna 42. In FIG. 4C, the lowest communication band of the lowest operating band for the antenna 42 in the communication device 4 is global system for mobile communications 850 (GSM850), so that a lowest operating frequency thereof is about 824 MHz. In the experiment of the communication device 4, the coupling spacings of the mutual coupling portions 3132, 3233, 3334, 3435 and 3536 are all about 0.2 mm. The coupling spacing of the coupling portion 443 between the second conductor portion 442 and the current-drawing conductor structure 43 is about 0.4 mm. The conductor elements 431, 432, 433, 434, 435 and 436 are electrodes of solar cells. The dielectric substrates 4312, 4322, 4332, 4342, 4352 and 4362 are photoelectric silicon substrate. However, it is only an experiment embodiment of the communication device 4, which is not used to limit possible implementation of the disclosure.

The shortest distance between the source 421 and the position where the first conductor portion 441 of the communication device 4 is electrically connected to the ground 11 is less than $\frac{1}{8}$ of the wavelength of the lowest operating frequency of the lowest operating band of the antenna 42. In this way, the antenna 42 equivalently has two effective antenna grounds in the lower operating band, and a plurality of coupling current resonant paths with, different effective lengths are formed, and accordingly the antenna 42 could generate a plurality of resonant modes in the lower operating band. In FIG. 4C, by configuring the coupling conductor structure 44 and the current-drawing conductor structure 43, due to the effective extending ground of the antenna 42, the antenna 42 forms a plurality of resonant modes in the lower operating band, and the impedance bandwidth of the lower operating band of the antenna 42 is effectively enhanced. Such operating bands could be used to transmit or receive electromagnetic signals of at least one communication band. Moreover, the formed effective extending antenna ground could have an opportunity to reduce the strength of excited surface current on the ground 11, so as to reduce SAR or HAC values of the antenna 42 in operating bands.

In the present embodiment, the lower and higher operating bands of the antenna 42 of the communication device 4 could respectively cover different communication bands of GSM850/900 and GSM1800. However, FIG. 4C is only an example that the antenna of the communication device 4 could generate at least one operating band, and the operating bands generated by the antenna of the communication device 4 could be used to transmit or receive electromagnetic signals of at least one communication band, which is not used to limit possible implementation of the disclosure. The operating bands generated by the antenna of the communication device 4 could be used to transmit or receive electromagnetic signals of long term evolution (LTE) systems, worldwide interoperability for microwave access (WiMAX) systems, digital television broadcasting (DTV) systems, global positioning systems (GPS), wireless wide area network (WWAN) systems, wireless local area network (WLAN) systems, ultra-wideband (UWB) systems, wireless personal area network (WPAN) systems, satellite communication systems or other wireless communication bands or mobile communication bands.

Figure 5A:
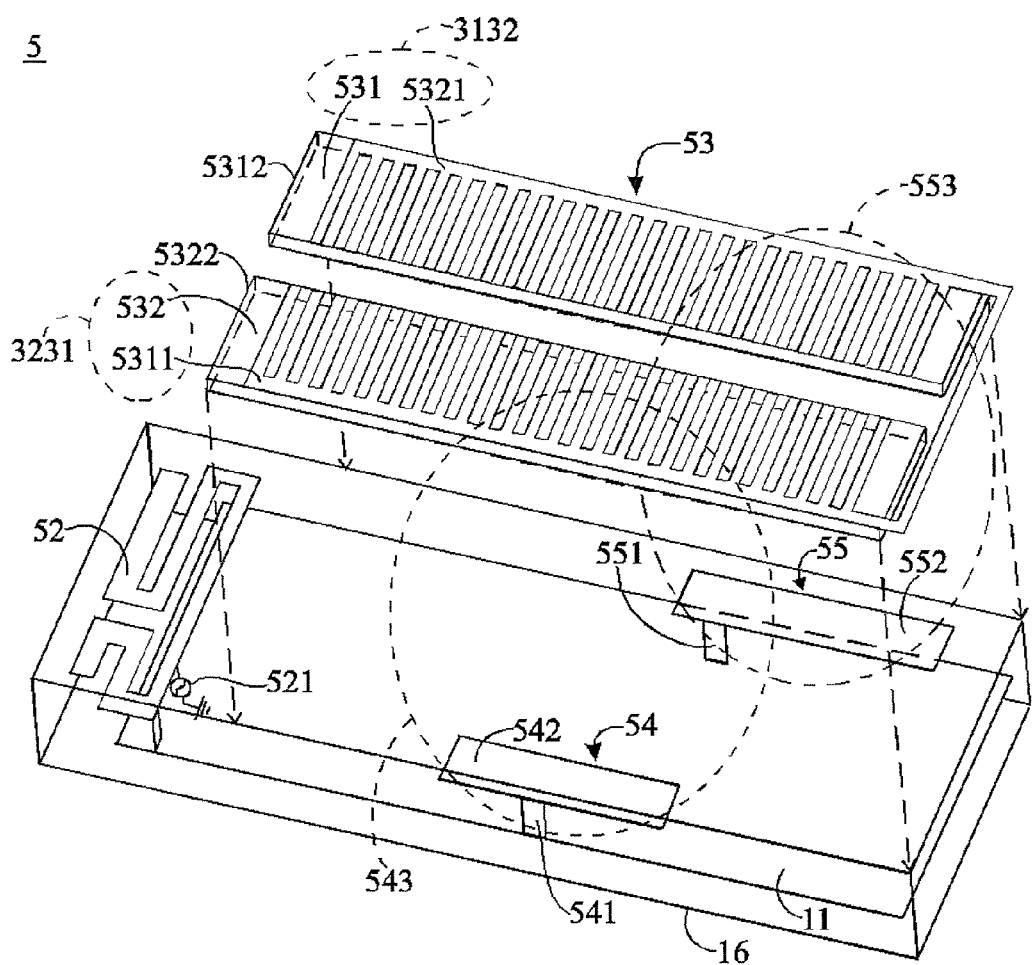
FIG. 5A is a structural schematic diagram of a communication device 5 according to an exemplary embodiment of the disclosure.

FIG. 5A is a structural schematic diagram of a communication device 5 according to an exemplary embodiment of the disclosure. The communication device 5 includes a ground 11, an antenna 52, a current-drawing conductor structure 53, two coupling conductor structures 54 and 55, and a casing 16. For example, the antenna 52 is a dual-path shorted monopole antenna, which is connected to the ground 11 through a source 521, and generates at least one operating band for transmitting or receiving electromagnetic signals of at least one communication band. However, possible implementation of the disclosure is not limited thereto, and the antenna 52 could also be monopole antenna types, planner inverted F antenna types, inverted F antenna types, loop antenna types, slot antenna types, helical antenna types, quadrifilar helical antenna types, N-filar helical antenna types or combinations thereof.

Referring to FIG. 5A, the current-drawing conductor structure 53 is disposed on the casing 16, and has two conductor elements 531 and 532. An extending conductor portion 5321 of the conductor element 532 and the conductor element 531 are respectively disposed on an upper surface and a lower surface of a dielectric substrate 5312 to form a mutual coupling portion 3132. An extending conductor portion 5311 of the conductor element 531 and the conductor element 532 are respectively disposed on an upper surface and a lower surface of a dielectric substrate 5322 to form a mutual coupling portion 3231. The extending conductor potions 5321 and 5311 respectively have a comb-shape, though possible implementation of the disclosure is not limited thereto, which could also be metal sheets with different shapes or have a plurality of metal branches. The coupling spacing of the mutual coupling portions 3132 between the extending conductor portion 5321 and the conductor element 531 is less than 1% of a wavelength of a lowest operating frequency of a lowest operating band of the antenna 52. The coupling spacing of the mutual coupling portions 3231 between the extending conductor portion 5311 and the conductor element 532 is also less than 1% of a wavelength of a lowest operating frequency of a lowest operating band of the antenna 52. Moreover, the dielectric substrates 5312 and 5322 could be different materials of a dielectric material, a plastic material, a flexible printed circuit board material, a photoelectric conversion material, a photoelectric semiconductor material or a solar photovoltaic conversion material, etc.

The coupling conductor structure 54 has a first conductor portion 541 and a second conductor portion 542, one end of the first conductor portion 541 is electrically connected to the ground 11, and another end thereof is electrically connected to the second conductor portion 542. The coupling conductor structure 55 has a first conductor portion 551 and a second conductor portion 552, where one end of the first conductor portion 551 is electrically connected to the ground 11, and another end thereof is electrically connected to the second conductor portion 552. The second conductor portion 542 and the current-drawing conductor structure 53 form a coupling portion 543. The second conductor portion 552 and the current-drawing conductor structure 53 form a coupling portion 553. The coupling spacing of the coupling portion 543 between the second conductor portion 542 and the current-drawing conductor structure 53 is less than 2% of the wavelength of the lowest operating frequency of the lowest operating band of the antenna 52. The coupling spacing of the coupling portion 553 between the second conductor portion 552 and the current-drawing conductor structure 53 is less than 2% of the wavelength of the lowest operating frequency of the lowest operating band of the antenna 52. The distances between the positions where the first conductor portions 541 and 551 are electrically connected to the ground 11 and the source 521 are both less than a half wavelength of the lowest operating frequency of the lowest operating band of the antenna 52.

The conductor elements 531 and 532 approximately have rectangular shapes. Moreover, the conductor elements 531 and 532 could be different metal materials, metal electrodes, or electrodes of a solar photovoltaic conversion apparatus. When the antenna 52 resonates in an operating band, the ground 11 would excite strong surface current distribution. Therefore, by designing the mutual couplings between the current-drawing conductor structure 53 and the coupling conductor structures 54 and 55, the current-drawing conductor structure 53 could equivalently form another effective extending ground for the antenna 52. Moreover, because the formed effective extending ground has the two conductor elements 531 and 532 mutually coupled to each other, a plurality of coupling current resonant paths with different effective lengths could be formed. Thus, by configuring the mutual coupling between the current-drawing conductor structure 53 and the coupling conductor structures 54 and 55, the antenna 52 could generate a plurality of resonant modes in the operating band, so that an impedance bandwidth of at least one operating band of the antenna 52 could be effectively enhanced. Such operating band could be used to transmit or receive electromagnetic signals of at least one communication band. Moreover, the formed effective extending ground of antenna 52 could have an opportunity to reduce the strength of excited surface current on the ground 11, so as to reduce SAR or HAC values of the antenna 52 in operating bands.

Figure 5B:
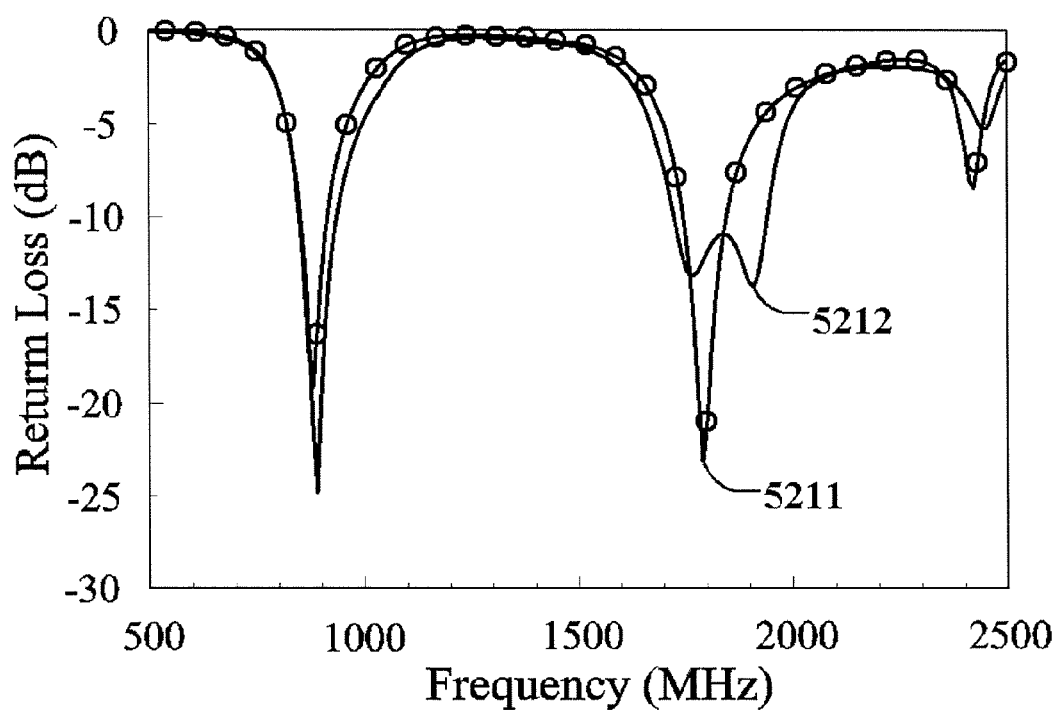
FIG. 5B is a diagram illustrating measured return losses of an antenna of the communication device 5 in case that a coupling conductor structure and a current-drawing conductor structure are configured with the antenna/not configured with the antenna.

FIG. 5B is a diagram illustrating measured return losses of the antenna 52 of the communication device 5 in case that the coupling conductor structures 54 and 55 and the current-drawing conductor structure 53 are configured with the antenna 52/not configured with the antenna 52. A curve 5211 is a measured return loss curve of the antenna 52 in case that the coupling conductor structures 54 and 55 and the current-drawing conductor structure 53 are not configured with the antenna 52. A curve 5212 is a measured return loss curve of the antenna 52 in case that the coupling conductor structures 54 and 55 and the current-drawing conductor structure 53 are configured with the antenna 52. In FIG. 5B, the lowest communication band of the lowest operating band for the antenna 52 in the communication device 5 is GSM850, so that a lowest operating frequency thereof is about 824 MHz.

The shortest distances between the source 521 and the positions where the first conductor portions 541 and 551 are electrically connected to the ground 11 are both between ⅛ to ¼ of the wavelength of the lowest operating frequency of the lowest operating band of the antenna 52. In this way, the formed effective extending antenna ground could suppress the surface current excitation of the antenna 52 in the higher operating band at a tail end of the ground 11, so as to generate an equivalent ground length that is beneficial for resonance of the antenna 52 at higher operating band. Therefore, in the present embodiment, due to the mutual couplings between the current-drawing conductor structure 53 and the coupling conductor structures 54 and 55 in the communication device 5, the antenna 52 could form a plurality of resonant modes in the higher operating band, and an impedance bandwidth of the higher operating band of the antenna 52 is effectively enhanced. Such operating bands could be used to transmit or receive electromagnetic signals of at least one communication band. Moreover, the formed effective extending antenna ground could have an opportunity to reduce the strength of excited surface current on the ground 11, so as to reduce SAR or HAC values of the antenna 52 in operating bands.

In the present embodiment, the lower and higher operating bands of the antenna 52 of the communication device 5 could respectively cover different communication bands of GSM850/900 and GSM1800. However, FIG. 5B is only an example that the antenna of the communication device 5 could generate at least one operating band, and the operating bands generated by the antenna of the communication device 5 could be used to transmit or receive electromagnetic signals of at least one communication band, which is not used to limit possible implementation of the disclosure. The operating bands generated by the antenna of the communication device 5 could be used to transmit or receive electromagnetic signals of LTE systems, WiMAX systems, DTV systems, GPS, WWAN systems, WLAN systems, UWB systems, WPAN systems, satellite communication systems or other wireless communication bands or mobile communication bands.

In the experiment of the communication device 5, the coupling spacings of the mutual coupling portions 3132 and 3231 are all about 0.4 mm. The coupling spacing of the coupling portions 543 and 553 are about 0.8 mm. The conductor elements 531 and 532 are metal plates. The dielectric substrates 5312 and 5322 are FR4 substrates. However, it is only an experiment embodiment of the communication device 5, which is not used to limit possible implementation of the disclosure.

In the aforementioned exemplary embodiment, the disclosed communication device includes at least one ground, at least one antenna, a current-drawing conductor structure, at least one coupling conductor structure and a casing. The at least one antenna is electrically connected to the at least one ground through a source and generates at least one operating band for transmitting or receiving electromagnetic signals of at least one communication band. The at least one antenna could be monopole antenna types, planner inverted F antenna types, inverted F antenna types, loop antenna types, slot antenna types, helical antenna types, quadrifilar helical antenna types, N-filar helical antenna types or combinations thereof. The current-drawing conductor structure is disposed on the casing and has a plurality of conductor elements, where there is a mutual coupling portion between neighboring conductor elements. The mutual coupling portion between the neighboring conductor elements could be formed by chip capacitors or other extending conductor portions.

The at least one coupling conductor structure has a first conductor portion and a second conductor portion. One end of the first conductor portion is electrically connected to the ground, and another end thereof is electrically connected to the second conductor portion. A coupling portion is formed between the second conductor portion and the current-drawing conductor structure. The shortest distance between the source and the position where the first conductor portion is electrically connected to the ground is smaller than a half wavelength of a lowest operating frequency of a lowest operating band of the antenna.

The conductor elements and the second conductor portion could be metal sheets of different shapes or have a plurality of metal branches. Moreover, the conductor elements could be different metal materials, metal electrodes, or electrodes of a solar photovoltaic apparatus. When the antenna resonates in an operating band, the ground would excite strong surface current distribution. Therefore, by designing the mutual coupling between the coupling conductor structure and the current-drawing conductor structure, the current-drawing conductor structure could equivalently form another effective extending ground for the antenna. Moreover, because the formed effective extending ground of the antenna has a plurality of the conductor elements mutually coupled to each other, a plurality of coupling current resonant paths with different effective lengths could be formed. Thus, by configuring the mutual coupling between the current-drawing conductor structure and the coupling conductor structure, the antenna could generate a plurality of resonant modes in the operating band, so that the impedance bandwidth of at least one operating band of the antenna could be effectively enhanced. Such operating band could be used to transmit or receive electromagnetic signals of at least one communication band. Moreover, the formed effective extending ground could have an opportunity to reduce the strength of excited surface current on the ground, so as to reduce SAR or HAC values of the antenna in operating bands.

FIG. 6 is a flowchart illustrating a method for enhancing an impedance bandwidth of an antenna of a communication device according to an exemplary embodiment of the disclosure. The method includes following steps. A current-thawing conductor structure is disposed on a casing of a communication device having at least one antenna and at least one ground (step 601), where the current-thawing conductor structure includes a plurality of conductor elements, and there is at least one mutual coupling portion formed between neighboring conductor elements. Moreover, a coupling conductor structure is connected to the ground (step 602), where the coupling conductor structure has a first conductor portion and a second conductor portion, one end of the first conductor portion is electrically connected to the ground, and another end thereof is electrically connected to the second conductor portion. There is at least one coupling portion formed between the second conductor portion and the current-drawing conductor structure.

In the aforementioned method, the antenna is electrically connected to the ground through a source, and the antenna generates at least one operating band for transmitting or receiving electromagnetic signals of at least one communication band. The antenna could be monopole antenna types, shorted monopole antenna types, planner inverted F antenna types, inverted F antenna types, loop antenna types, slot antenna types, helical antenna types, quadrifilar helical antenna types, N-filar helical antenna types or combinations thereof. One of the conductor elements forms the at least one mutual coupling portion with the neighboring conductor element through extending conductor portions. Alternatively, one of the conductor elements forms the at least one mutual coupling portion with the neighboring conductor element through chip capacitors. The conductor elements could be metal sheets of different shapes or the conductor elements have a plurality of metal branches. The second conductor portion could be a metal sheet of different shapes or the second conductor portion has a plurality of metal branches. A matching circuit could be disposed between the antenna and the source. The conductor elements could be different metal materials, metal electrodes, or electrodes of a solar photovoltaic conversion apparatus. The shortest distance between the source and the position where the first conductor portion is electrically connected to the ground is less than a half wavelength of a lowest operating frequency of a lowest operating band of the antenna.

When the antenna resonates in an operating band, the ground would excite strong surface current distribution. Therefore, by designing the mutual coupling between the coupling conductor structure and the current-drawing conductor structure, the current-drawing conductor structure could equivalently form another effective extending ground for the antenna. Moreover, because the formed effective extending ground of the antenna has a plurality of the conductor elements mutually coupled to each other, a plurality of coupling current resonant paths with different effective lengths are formed. Thus, by configuring the mutual coupling between the current-drawing conductor structure and the coupling conductor structure, the antenna could generate a plurality of resonant modes in the operating band, so that the impedance bandwidth of such operating band of the antenna could be effectively enhanced. Such operating band could be used to transmit or receive radio frequency (RF) signals of at least one communication band. Moreover, the formed effective extending antenna ground could have an opportunity to reduce the strength of excited surface current on the ground, so as to reduce SAR or HAC values of the antenna in operating bands.

Figure 7:
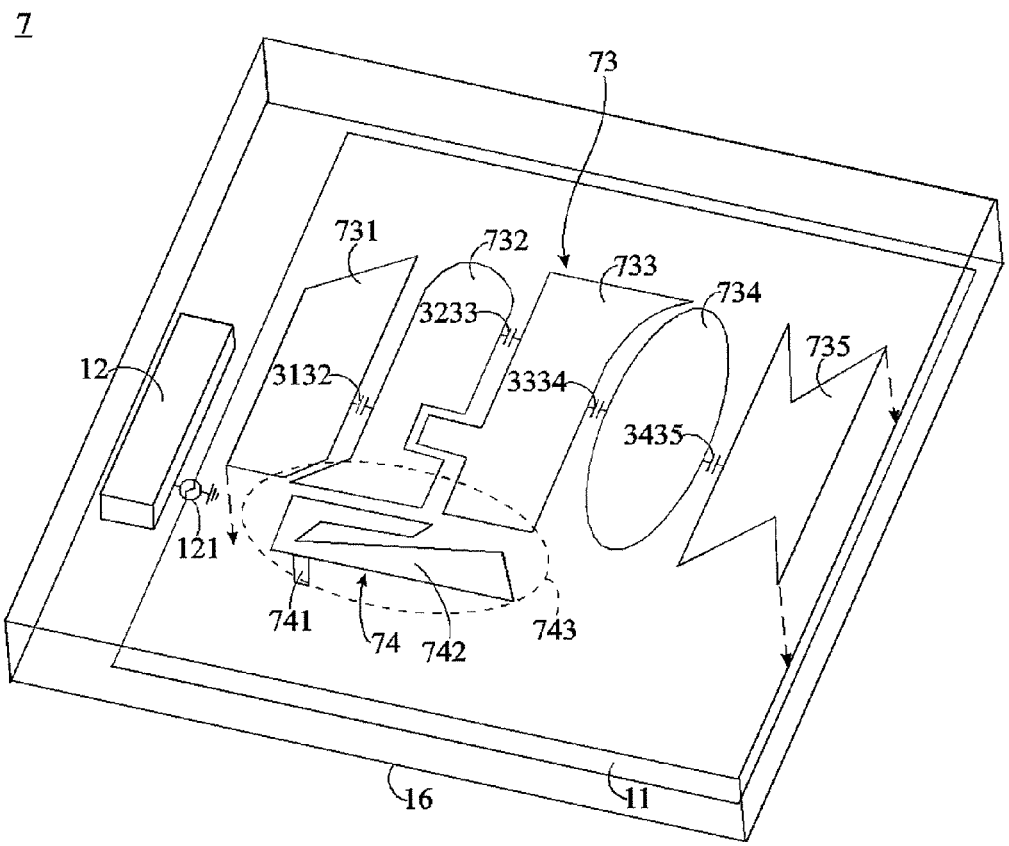
FIG. 7 is a structural schematic diagram of the communication device 7 according to an exemplary embodiment of the disclosure.

A communication device 7 of FIG. 7 is implemented by using the method of FIG. 6, and FIG. 7 is a structural schematic diagram of the communication device 7 according to an exemplary embodiment of the disclosure. The method could be described as follows. A current-drawing conductor structure 73 is disposed on a casing 16 of a communication device 7 having at least one antenna 12 and a ground 11, where the current-drawing conductor structure 73 includes a plurality of conductor elements 731, 732, 733, 734 and 735, and there is at least one mutual coupling portion formed between neighboring conductor elements. A coupling conductor structure 74 is connected to the ground 11, where the coupling conductor structure 74 has a first conductor portion 741 and a second conductor portion 742. One end of the first conductor portion 741 is electrically connected to the ground 11, and another end thereof is electrically connected to the second conductor portion 742. The second conductor portion 742 and the current-drawing conductor structure 73 form at least one coupling portion 743, so as to effectively enhance the impedance bandwidth of at least one operating band generated by the antenna 12.

There is a mutual coupling portion 3132 formed between the conductor elements 731 and 732; there is a mutual coupling portion 3233 formed between the conductor elements 732 and 733; there is a mutual coupling portion 3334 formed between the conductor elements 733 and 734; and there is a mutual coupling portion 3435 formed between the conductor elements 734 and 735. Each of the mutual coupling portions 3132, 3233, 3334 and 3435 could be formed by extending conductor portions or neighboring conductor elements, or could be formed by chip capacitors connecting one of the conductor elements to the neighboring conductor element.

The antenna 12 is electrically connected to the ground 11 through a source 121 and generates at least one operating band for transmitting or receiving electromagnetic signals of at least one communication band. The antenna 12 could be monopole antenna types, planner inverted F antenna types, inverted F antenna types, loop antenna types, slot antenna types, helical antenna types, quadrifilar helical antenna types, N-filar helical antenna types or combinations thereof. The coupling spacing of the coupling portion 743 between the second conductor portion 742 and the current-drawing conductor structure 73 is less than 2% of the wavelength of a lowest operating frequency of a lowest operating band of the antenna 12. The shortest distance between the source 121 and the position where the first conductor portion 741 is electrically connected to the ground 11 is less than a half wavelength of the lowest operating frequency of the lowest operating band of the antenna 12. The conductor elements 731, 732, 733, 734 and 735 and the second conductor portion 742 could be metal sheets with different shapes or have a plurality of metal branches. Moreover, the conductor elements 731, 732, 733, 734 and 735 could be different metal materials, metal electrodes, or electrodes of a solar photovoltaic conversion apparatus.

When the antenna 12 resonates in an operating band, the ground 11 would excite strong surface current distribution. Therefore, by designing the coupling portion 343 formed by the coupling conductor structure 74 and the current-drawing conductor structure 73, the current-drawing conductor structure 73 could equivalently form another effective extending ground for the antenna 12. Moreover, because the formed effective extending ground of antenna 12 has a plurality of the conductor elements 731, 732, 733, 734 and 735 mutually coupled to each other, a plurality of coupling current resonant paths with different effective lengths could be formed. Thus, by configuring the mutual coupling between the current-drawing conductor structure 73 and the coupling conductor structure 74, the antenna 12 could generate a plurality of resonant modes in the operating band, so that the impedance bandwidth of at least one operating band of the antenna 12 could be effectively enhanced. Such operating band could be used to transmit or receive electromagnetic signals of at least one communication band. Moreover, the formed effective extending antenna ground could have an opportunity to reduce the strength of excited surface current on the ground 11, so as to reduce SAR or HAC values of the antenna 12 in operating bands.

Figure 8A:
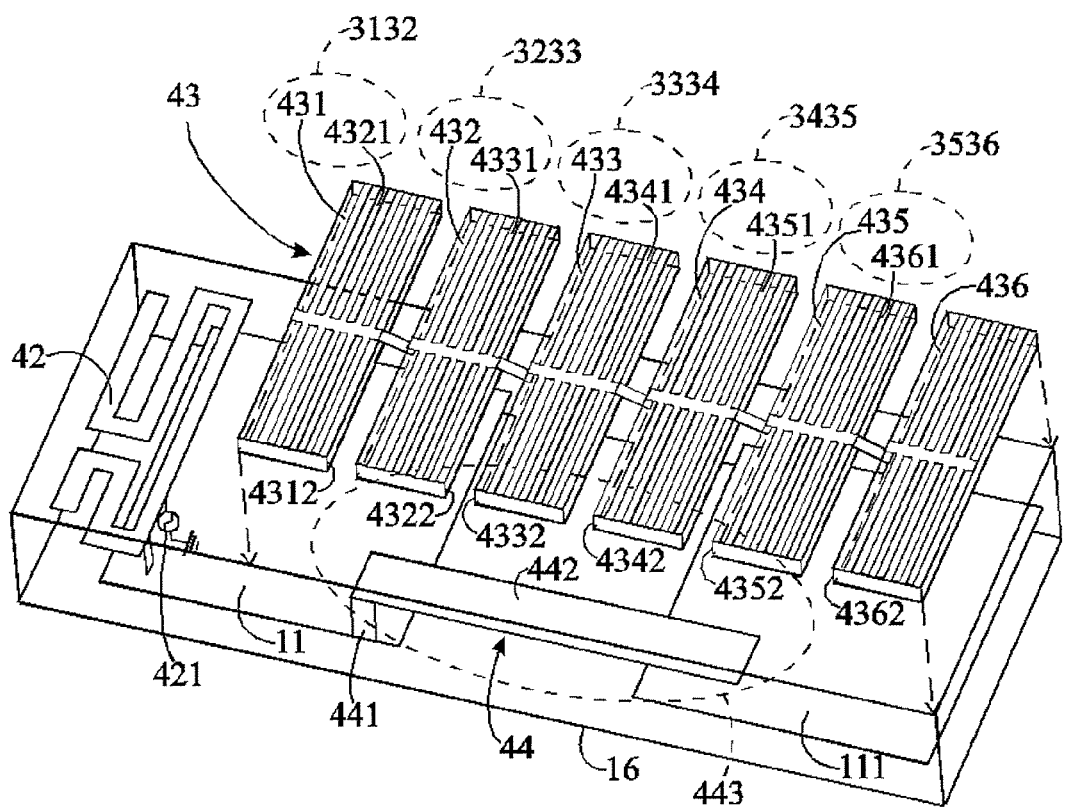
FIG. 8A is a structural schematic diagram of a communication device 8 according to an exemplary embodiment of the disclosure.

The method illustrated in FIG. 6 is applied to a communication device 8 of FIG. 8A, and FIG. 8A is a structural schematic diagram of a communication device 8 according to an exemplary embodiment of the disclosure. The proposed method includes following procedures: a current-drawing conductor structure 43 is disposed on a casing 16 of a communication device 8 having at least one antenna 42 and at least one ground. The communication device 8 has two separated grounds 11, 111, which could be respective grounds configured for different electric circuit systems. The grounds 11 and 111 could also be electrically connected through coaxial cables, signal transmission lines or by different ways. The current-drawing conductor structure 43 has a plurality of conductor elements 431, 432, 433, 434, 435 and 436, and there is at least one mutual coupling portion formed between neighboring conductor elements. A coupling conductor structure 44 is connected to the ground 11, where the coupling conductor structure 44 has a first conductor portion 441 and a second conductor portion 442. One end of the first conductor portion 441 is electrically connected to the ground 11, and the other end of the first conductor portion 441 is electrically connected to the second conductor portion 442. The second conductor portion 442 and the current-drawing conductor structure 43 forms at least one coupling portion 443, so as to effectively enhance the impedance bandwidth of at least one operating band of the antenna 42.

For example, the antenna 42 is a dual-path shorted monopole antenna, which is connected to the ground 11 through a source 421, and generates an operating band for transmitting or receiving electromagnetic signals of at least one communication band. However, possible implementation of the disclosure is not limited thereto, and the antenna 42 could also be monopole antenna types, shorted monopole antenna types, planner inverted F antenna types, inverted F antenna types, loop antenna types, slot antenna types, helical antenna types, quadrifilar helical antenna types, N-filar helical antenna types or combinations thereof. In addition, the communication 8 could have a plurality layer of grounds or have grounds configured for a plurality of electric circuit systems.

Retelling to FIG. 8A, the current-drawing conductor structure 43 is disposed on the casing 16, and has a plurality of conductor elements 431, 432, 433, 434, 435 and 436. An extending conductor portion 4321 of the conductor element 432 and the conductor element 431 are respectively disposed on an upper surface and a lower surface of a dielectric substrate 4312 to form a mutual coupling portion 3132. For example, the conductor element 431 is disposed on the lower surface of the dielectric substrate 4312, and the extending conductor portion 4321 connected to the conductor element 432 is disposed on the upper surface of the dielectric substrate 4312. An extending conductor portion 4331 of the conductor element 433 and the conductor element 432 are respectively disposed on an upper surface and a lower surface of a dielectric substrate 4322 to form a mutual coupling portion 3233. An extending conductor portion 4341 of the conductor element 434 and the conductor element 433 are respectively disposed on an upper surface and a lower surface of a dielectric substrate 4332 to form a mutual coupling portion 3334. An extending conductor portion 4351 of the conductor element 435 and the conductor element 434 are respectively disposed on an upper surface and a lower surface of a dielectric substrate 4342 to form a mutual coupling portion 3435. An extending conductor portion 4361 of the conductor element 436 and the conductor element 435 are respectively disposed on an upper surface and a lower surface of a dielectric substrate 4352 to form a mutual coupling portion 3536. The conductor element 436 is disposed on a lower surface of a dielectric substrate 4362. The coupling spacings of the mutual coupling portions 3132, 3233, 3334, 3435 and 3436 are less than 1% of a wavelength of a lowest operating frequency of a lowest operating band of the antenna 42.

The extending conductor portions 4321, 4331, 4341, 4351 and 4361 respectively have a shape of a fish bone, though possible implementation of the disclosure is not limited thereto, and the extending conductor portions 4321, 4331, 4341, 4351 and 4361 could also be metal sheets with different shapes or have a plurality of metal branches. Moreover, the dielectric substrates 4312, 4322, 4332, 4342, 4352 and 4362 could be different materials of a dielectric material, a plastic material, a flexible printed circuit board material, a photoelectric conversion material, a photoelectric semiconductor material or a solar photovoltaic conversion material, etc.

The coupling spacing of the coupling portion 443 between the second conductor portion 442 and the current-drawing conductor structure 43 is less than 2% of the wavelength of the lowest operating frequency of the lowest operating band of the antenna 42. A shape of the second conductor portion 442 is approximately y a rectangle, and the shortest distance between the source 421 and the position where the first conductor portion 441 is electrically connected to the ground 11 is less than a half wavelength of the lowest operating frequency of the lowest operating band of the antenna 42. The conductor elements 431, 432, 433, 434, 435 and 436 approximately have rectangular shapes. Moreover, the conductor elements 431, 432, 433, 434, 435 and 436 could be different metal materials, metal electrodes, or electrodes of a solar photovoltaic conversion apparatus.

When the antenna 42 resonates in an operating band, the ground 11 would excite strong surface current distribution. Therefore, by designing the coupling portion 443 formed between the coupling conductor structure 44 and the current-drawing conductor structure 43, the current-drawing conductor structure 43 could equivalently form an effective extending ground for the antenna 42, so as to compensate the situation of insufficient resonant length of the ground 11. When more conductor elements form capacitive coupling with the second conductor portion 442, the energy coupling strength between the coupling conductor structure 44 and the current-drawing conductor structure 43 would be enhanced. Moreover, because the formed effective extending ground of antenna 12 has a plurality of the conductor elements 431, 432, 433, 434, 435 and 436 mutually coupled to each other, a plurality of coupling current resonant paths with different effective lengths could be formed. Therefore, by configuring mutual coupling of the current-drawing conductor structure 43 and the coupling conductor structure 44, the antenna 42 could generate a plurality of resonant modes in the operating band, so that the impedance bandwidth of at least one operating band of the antenna 42 could be effectively enhanced. Such operating band could be used to transmit or receive electromagnetic signals of at least one communication band. Moreover, the formed effective extending antenna ground could have an opportunity to reduce the strength of excited surface current on the ground 11, so as to reduce SAR or HAC values of the antenna 12 in operating bands.

Figure 8B:
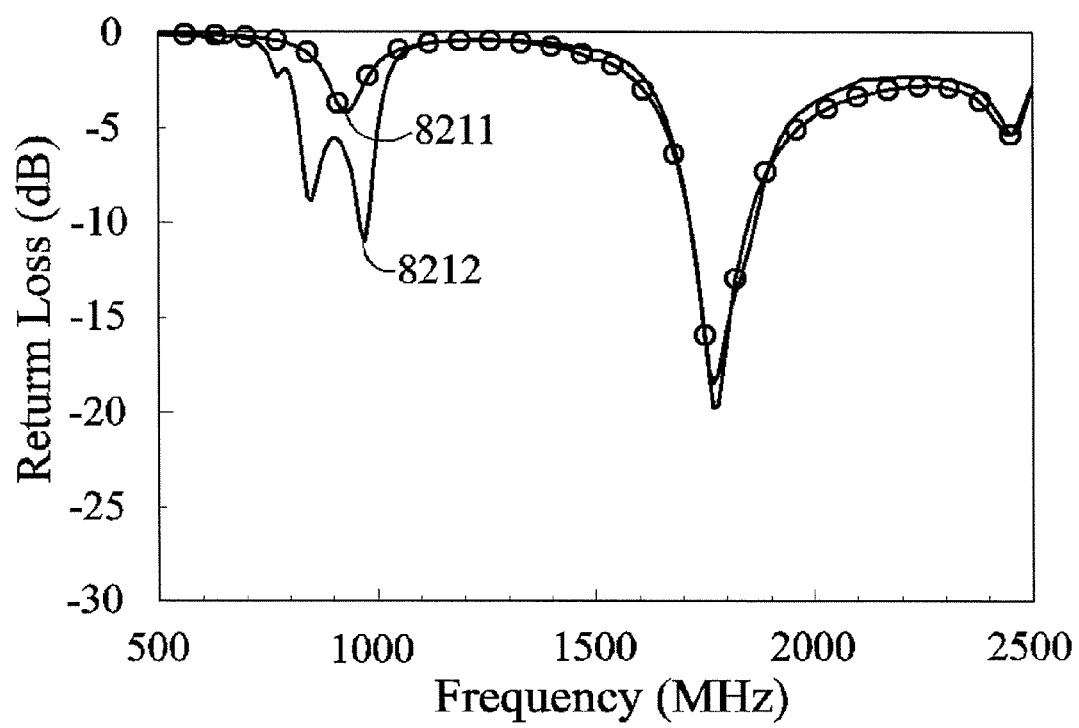
FIG. 8B is a diagram illustrating measured return losses of an antenna of the communication device 8 in case that a coupling conductor structure and a current-drawing conductor structure are configured with the antenna/not configured with the antenna.

FIG. 8B is a diagram illustrating measured return losses of the antenna 42 of the communication device 8 in case that the coupling conductor structure 44 and the current-drawing conductor structure 43 are configured with the antenna 42/not configured with the antenna 42. A curve 8211 is a measured return loss curve of the antenna 42 in case that the coupling conductor structure 44 and the current-drawing conductor structure 43 are not configured with the antenna 42. A curve 8212 is a measured return loss curve of the antenna 42 in case that the coupling conductor structure 44 and the current-drawing conductor structure 43 are configured with the antenna 42. In FIG. 8B, a lowest communication band of a lowest operating band of the antenna 42 of the communication device 8 is GSM850, so that a lowest operating frequency thereof is about 824 MHz.

The shortest distance between the source 421 and the position where the first conductor portion 441 of the communication device 8 is electrically connected to the ground 11 is less than ⅛ of the wavelength of the lowest operating frequency of the lowest operating band of the antenna 42. The mutual coupling between the coupling conductor structure 44 and the current-drawing conductor structure 43 could equivalently form another effective extending ground for the antenna 42, so as to compensate the situation of insufficient resonant length of the ground 11. In this way, the impedance matching of the resonant mode of the antenna 42 in a lower operating band could be improved, so as to effectively enhance the impedance bandwidth of the lower operating band of the antenna 42. It could be observed in FIG. 8B, by configuring the coupling conductor structure 44 and the current-drawing conductor structure 43, due to the formed effective extending antenna ground, the antenna 42 could successfully generate a plurality of resonant modes in the lower operating band, and the impedance bandwidth of the lower operating band of the antenna 42 is effectively enhanced. Such operating bands could be used to transmit or receive electromagnetic signals of at least one communication band.

In the experiment of the communication device 8, the coupling spacings of the mutual coupling portions 3132, 3233, 3334, 3435 and 3536 are all about 0.2 mm. The coupling spacing of the coupling portion 443 between the second conductor portion 442 and the current-drawing conductor structure 43 is about 0.4 mm. The conductor elements 431, 432, 433, 434, 435 and 436 are electrodes of solar cells. The dielectric substrates 4312, 4322, 4332, 4342, 4352 and 4362 are photoelectric silicon substrate. However, it is only an experiment embodiment of the communication device 8, which is not used to limit possible implementation of the disclosure.

In the present embodiment, the lower and higher operating bands for the antenna 42 in the communication device 8 could respectively cover different communication bands of GSM850/900 and GSM1800. However, FIG. 8B is only an example that the antenna of the communication device 8 could generate at least one operating band, and the operating bands generated by the antenna of the communication device 4 could be used to transmit or receive electromagnetic signals of at least one communication band, which is not used to limit possible implementation of the disclosure. The operating bands generated by the antenna of the communication device 8 could be used to transmit or receive electromagnetic signals of LTE systems, WiMAX systems, DTV systems, GPS systems, WWAN systems, WLAN systems, UWB systems, WPAN systems, satellite communication systems or other wireless communication bands or mobile communication bands.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A communication device, comprising:
   at least one ground plane;
   at least one antenna, electrically connected to the at least one ground plane through a signal source, and generating at least one operating band for transceiving electromagnetic signals of at least one communication band;
   a current-drawing conductor structure, having a plurality of conductor elements comprising a first conductor element coupling to a first extending conductor portion through a first dielectric substrate to form a first mutual coupling portion, and the first extending conductor portion is connected to a second conductor element which is neighboring to the first conductor element, wherein the first conductor element is on bottom side of the first dielectric substrate and the first extending conductor portion which is not directly connected to the first conductor element is on top side of the first dielectric substrate, wherein a coupling space of the first mutual coupling portion between the first extending conductor portion and the first conductor element is less than 1% of a wavelength of a lowest operating frequency of a lowest operating band of the antenna; and at least one coupling conductor structure, having a first conductor portion and a second conductor portion, wherein one end of the first conductor portion is electrically connected to the at least one ground plane, and another end thereof is electrically connected to the second conductor portion, and the second conductor portion is disposed between the at least one ground plane and the conductor elements of the current-drawing conductor structure and indirectly connected to the ground plane via the first conductor portion to form at least one coupling portion with the conductor elements simultaneously, wherein the shortest distance between the source and the position where the first conductor portion is electrically connected to the ground is less than a half wavelength of a lowest operating frequency of a lowest operating band of the antenna.

2. The communication device as claimed in claim 1, wherein the first conductor element and the first extending conductor portion are formed on both sides of the dielectric substrate.

3. The communication device as claimed in claim 1, wherein the conductor elements are metal sheets of different shapes.

4. The communication device as claimed in claim 1, wherein the conductor elements are metal sheets of the same shape.

5. The communication device as claimed in claim 1, wherein the conductor elements have a plurality of metal branches.

6. The communication device as claimed in claim 1, wherein the second conductor portion has a plurality of metal branches.

7. The communication device as claimed in claim 1, wherein one of the conductor elements is electrically connected to the at least one ground.

8. The communication device as claimed in claim 1, wherein a matching circuit is connected between the at least one antenna and the source.

9. The communication device as claimed in claim 1, wherein the conductor elements are different metal materials, metal electrodes, or electrodes of a solar photovoltaic conversion apparatus.

10. The communication device as claimed in claim 1, further comprising a casing, wherein the current-drawing conductor structure is disposed outside the casing, the at least one coupling conductor structure and the at least one antenna are disposed inside the casing.

11. A method for enhancing impedance bandwidth of antenna, adapted to a communication device, and the method for enhancing impedance bandwidth of antenna comprising:

disposing a current-drawing conductor structure on a casing of the communication device having at least one antenna and at least one ground plane, wherein the current-drawing conductor structure comprising a first conductor element coupling to a first extending conductor portion through a first dielectric substrate to form a mutual coupling portion, and the first extending conductor portion is connected to a second conductor element which is neighboring to the first conductor element, wherein the first conductor element is on bottom side of the first dielectric substrate and the first extending conductor portion which is not directly connected to the first conductor element is on top side of the first dielectric substrate, wherein a coupling space of the first mutual coupling portion between the first extending conductor portion and the first conductor element is less than 1% of a wavelength of a lowest operating frequency of a lowest operating band of the antenna; and connecting a coupling conductor structure to the ground plane, wherein the coupling conductor structure has a first conductor portion and a second conductor portion, one end of the first conductor portion is electrically connected to the ground plane, and another end thereof is electrically connected to the second conductor portion, and the second conductor portion is disposed between the at least one ground plane and the conductor elements of the current-drawing conductor structure and indirectly connected to the ground plane via the first conductor portion to form at least one coupling portion with the conductor elements simultaneously, wherein the shortest distance between the source and the position where the first conductor portion is electrically connected to the ground is less than a half wavelength of a lowest operating frequency of a lowest operating band of the antenna.

12. The method for enhancing impedance bandwidth of antenna as claimed in claim 11, wherein the antenna is connected to the ground through a source, and the antenna generates at least one operating band for transmitting or receiving electromagnetic signals of at least one communication band.

13. The method for enhancing impedance bandwidth of antenna as claimed in claim 11, wherein the first conductor element and the first extending conductor portion are formed on both sides of the dielectric substrate.

14. The method for enhancing impedance bandwidth of antenna as claimed in claim 11, wherein the conductor elements are metal sheets of different shapes.

15. The method for enhancing impedance bandwidth of antenna as claimed in claim 11, wherein the conductor elements are metal sheets of the same shape.

16. The method for enhancing impedance bandwidth of antenna as claimed in claim 11, wherein the conductor elements have a plurality of metal branches.

17. The method for enhancing impedance bandwidth of antenna as claimed in claim 11, wherein the second conductor portion has a plurality of metal branches.

18. The method for enhancing impedance bandwidth of antenna as claimed in claim 11, wherein the conductor elements are different metal materials, metal electrodes, or electrodes of a solar photovoltaic conversion apparatus.

19. The device of claim 1 further comprising a second extending conductor disposed on top side of a second dielectric substrate to form a second mutual coupling portion with the second conductor element disposed on the bottom side of the second dielectric substrate as the second mutual coupling portion is connected to the first extending conductor portion.

* * * * *